UNITED STATES PATENT OFFICE 2,316,258

PRODUCTION OF SOFTENING AGENTS

Paul Kümmel, Oranienburg, near Berlin, Germany; vested in the Alien Property Custodian No Drawing. Application February 24, 1940, Serial No. 320,722. In Germany February 23, 1939

8 Claims. (Cl. 252—1)

This invention relates to improvements in alkali glycolate and alkali lactate softening agents.

Such salts of organic hydroxycarboxylic acids of the aliphatic series are widely used in the textile and leather industries as softeners and also in the production of plastics, for making certain kinds of paper and board, in the preparation of glues and sizes, of synthetic substances like hectographic masses, etc. The use of such salts is, however, open to the objection that they produce good effects at first but are liable to harden during storing. This hardening is due to the fact that these lactates and glycolates are apparently not hygroscopic enough to maintain the originally attained softness, particularly when applied where they are exposed to the atmosphere.

It has now been found that this softness may be retained by adding water soluble organic oxyethers to the impregnating liquors. This addition insures greater retaining capacity for water without causing a drawback in other respects, which is quite surprising.

According to the invention, oxypolyalkylethers as obtained, for instance, by causing ethylene oxide to act on aliphatic alcohols or, better still, polyalcohols, are added to the alkali salts of glycollic or lactic acids. In such preparations of the ethers intermediate products may be produced at first which are frequently water insoluble. These may be rendered water soluble by further additions of ethylene oxide and are then added to the commercial salt solutions or to the diluted treating liquor.

Useful additions of this kind are for instance the following compounds: The products obtained by having ethylene oxide act on glycol, glycerin or their ethers and esters having at least one free hydroxyl group, sugar, sugar alcohols, etc.; likewise the products obtained from the action of other cyclic ethers than ethylene oxide on such aliphatic hydroxyl compounds, such cyclic ethers being for instance propylene oxide, oxypropylene oxide, epichlorohydrin, etc. The products resulting from the action of such oxides upon other aliphatic alcohols, as ethyl, propyl, butyl, amyl, capryl, dodecyl, tetradecyl, hexadecyl, octadecyl, octadecenyl alcohol, etc., may be used also, though the result normally obtainable by their use will not be equal to those procured with the products of the action of such oxides on polyatomic alcohols. The apparently similarly constituted resins resulting from glycerin manufacture, i. e. the residue of glycerin distillation generally believed to consist primarily of polyglycerols, and the corresponding polymerized residue from glycol manufacture may be used also if sufficiently water soluble. If the water solubility is not as required, good water soluble compounds can be readily obtained by using the above-mentioned oxides.

Except in special cases when higher percentages may be used, the addition should amount to approximately 1% to 15% of the salt content so as to form approximately 5% of the liquor. In this way, subsequent hardening of the goods is prevented with certainty. That the goods treated have a greater retaining capacity for water can be easily ascertained by the usual physical tests.

The following examples serve to illustrate the invention but are not intended to restrict it to what is disclosed by them.

Example 1

A parchment-like paper is drawn through a bath consisting of a 20 per cent. sodium lactate solution and 3% water soluble residue of glycerine distillation. The temperature of the treatment may be carried out at 35° to 40° C. and the duration thereof is about 15 minutes.

After this treatment, the paper will become extraordinarily soft and bulky and show a good feel while creases produced in the course of production completely disappear. The treated paper is preferably passed through squeezing rollers to reduce the amount of liquor carried by it to about 50% of its own weight and then dried for two hours at 50° C., preferably in vacuum. The paper hardens completely during drying but becomes translucent, soft and elastic again when exposed to the action of the atmosphere at ordinary temperature for five hours or more. Without a softener according to the invention the papers obtained will be harder and less pliable.

Example 2

A cellular wool fabric is drawn through a liquor containing 200 parts by weight 50 per cent. sodium lactate in aqueous solution and 7% glycerin ether alcohol. Squeezing is effected so that liquor equal to 100% of the fiber weight remains, whereupon drying takes place with a suitable device in an air current of 65° C. After drying the fabric was drawn over a steam bath.

A comparison of this fabric with a correspondingly finished fabric treated with a liquor containing no oxyether proved the superior softness of the fabric treated according to the invention.

After both fabrics had been stored three months, it was found again that the fabric treated with a liquor containing oxyether had a softer feel, whereas the other material had also an uneven feel, particularly at the edges, due to hardening.

Another technically important effect of the invention is surprisingly the following: The absorption of water from the air is, for instance pretty large in the case of papers, fabrics, etc. treated with lactates, no matter whether other softeners are added or not. Such absorption is greater than if glycerin alone were used for loading. At a higher temperature, say, above 25° C., the softener adjusted according to the instant invention shows, however, the peculiar capacity of preventing the paper or fabric from giving off water so that the desirable degree of softness is maintained.

I claim:

1. Treating liquors for improving the lasting quality of softness of alkali glycolate and alkali lactate softening agents consisting of aqueous solutions of alkali salts selected from the group consisting of the glycolates and lactates having a lesser addition of water soluble aliphatic oxyethers of the general formula

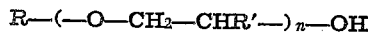

wherein R and R' are selected from the group consisting of a hydrogen atom and a substituted and an unsubstituted alkyl remainder, as obtained for instance from aliphatic alcohols, particularly di- and poly-alcohols and their derivatives having at least one free hydroxyl group, in reaction with aliphatic 1,2-oxides of the type of ethylene oxide.

2. A composition according to claim 1, in which the additions amount to approximately 1% to 15% of the dissolved salt or 1% to 5% of the treating liquor.

3. A softener for textile, leather, plastic and paper products consisting of a solution of a salt selected from the group consisting of the alkali metal glycolates and alkali metal lactates and of a minor portion of water soluble oxypolyalkylether serving to increase the hygroscopic properties of the softener.

4. Softeners for textile, leather, plastic and paper products, in which salts selected from the group consisting of alkali glycolates and lactates are the major ingredients and comprising a highly water soluble oxypolyalkylether forming up to substantially 15% of the salt contents of the softeners.

5. As softeners for textile, leather, plastic and paper goods alkali glycolates and alkali lactates mixed with water soluble polyglycerols for rendering said goods more pliable, the polyglycerols occurring in the mixtures as the minor constituent.

6. As softeners for textile, leather, plastic and paper goods alkali glycolates and alkali lactates mixed with glycerin ether alcohol for rendering said goods more pliable, the glycerin ether alcohol occurring in the mixtures as the minor constituent.

7. As softeners for textile, leather, plastic and paper goods alkali glycolates mixed with water soluble aliphatic oxyethers for rendering said goods more pliable, the aliphatic oxyethers occurring in the mixtures as the minor constituents.

8. As a softener for textile, leather, plastics and paper, the solution of an alkali salt selected from the group consisting of the glycolates and lactates, said solution containing from 1% to 5% of an oxypolyalkylether.

PAUL KÜMMEL.